United States Patent
KarimiRozbahani

(10) Patent No.: US 9,744,927 B2
(45) Date of Patent: Aug. 29, 2017

(54) GENERATING ELECTRICITY FROM AIR RESISTANCE CAUSED BY A MOVING VEHICLE

(71) Applicant: Mehdi KarimiRozbahani, Tehran (IR)

(72) Inventor: Mehdi KarimiRozbahani, Tehran (IR)

( * ) Notice: Subject to any disclaimer, the term of this patent is extended or adjusted under 35 U.S.C. 154(b) by 0 days.

(21) Appl. No.: 14/881,134

(22) Filed: Oct. 12, 2015

(65) Prior Publication Data
US 2016/0101750 A1   Apr. 14, 2016

(51) Int. Cl.
| | | |
|---|---|---|
| F03D 9/00 | (2016.01) | |
| H02P 9/04 | (2006.01) | |
| B60R 16/03 | (2006.01) | |
| F03D 9/32 | (2016.01) | |
| F03D 9/25 | (2016.01) | |
| F02D 29/06 | (2006.01) | |

(52) U.S. Cl.
CPC ........... B60R 16/0307 (2013.01); F03D 9/25 (2016.05); F03D 9/32 (2016.05); F05B 2240/941 (2013.01); Y02E 10/725 (2013.01); Y02E 10/728 (2013.01)

(58) Field of Classification Search
USPC .................................. 290/40 C, 43, 44, 55
See application file for complete search history.

(56) References Cited

U.S. PATENT DOCUMENTS

| | | | | |
|---|---|---|---|---|
| 3,374,849 A | * | 3/1968 | Redman ................. | B60K 16/00 180/2.2 |
| 3,556,239 A | * | 1/1971 | Spahn ...................... | B60K 1/00 180/2.2 |
| 3,876,925 A | * | 4/1975 | Stoeckert ............... | B60K 16/00 180/2.2 |
| 4,075,545 A | * | 2/1978 | Haberer .................. | B60K 1/04 180/2.2 |
| 4,143,731 A | * | 3/1979 | Haustein ............... | F01N 13/082 180/89.2 |
| 4,254,843 A | * | 3/1981 | Han ......................... | B60K 1/00 180/165 |
| 4,314,160 A | * | 2/1982 | Boodman ............... | B60K 16/00 180/2.2 |
| 4,423,368 A | * | 12/1983 | Bussiere ................. | B60K 16/00 180/2.2 |
| 4,424,452 A | * | 1/1984 | Francis ................... | B60K 16/00 290/44 |
| 4,460,055 A | * | 7/1984 | Steiner ................... | B62D 35/00 180/7.1 |
| 5,280,827 A | * | 1/1994 | Taylor ..................... | B60K 1/04 180/165 |
| 5,287,004 A | * | 2/1994 | Finley ..................... | B60K 16/00 180/2.2 |
| 5,386,146 A | * | 1/1995 | Hickey .................... | F03B 3/12 180/2.2 |

(Continued)

*Primary Examiner* — Pedro J Cuevas
(74) *Attorney, Agent, or Firm* — NovoTechIP International PLLC

(57) ABSTRACT

A system for generating electricity is provided. The system includes a vehicle and a wind turbine installed at one end of the vehicle. The wind turbine includes a plurality of input ports and a plurality of exit ports. The airflow around the vehicle enters the wind turbine via the plurality of input ports and exits the wind turbine via the plurality of exit ports causing the wind turbine to rotate and generate electricity.

16 Claims, 7 Drawing Sheets

(56) References Cited

U.S. PATENT DOCUMENTS

| | | | | |
|---|---|---|---|---|
| 5,644,170 A * | 7/1997 | Bynum | F03D 9/11 | 290/43 |
| 5,680,032 A * | 10/1997 | Pena | B60K 6/105 | 290/52 |
| 5,760,515 A * | 6/1998 | Burns | F03D 9/00 | 180/65.31 |
| 6,138,781 A * | 10/2000 | Hakala | B60K 16/00 | 180/165 |
| 6,373,145 B1 * | 4/2002 | Hamrick | B60K 16/00 | 290/42 |
| 6,700,215 B2 * | 3/2004 | Wu | B60K 16/00 | 290/44 |
| 6,838,782 B2 * | 1/2005 | Vu | B60K 6/48 | 290/44 |
| 6,857,492 B1 * | 2/2005 | Liskey | B60K 16/00 | 180/165 |
| 6,882,059 B1 * | 4/2005 | DePaoli | B60K 16/00 | 180/165 |
| 6,897,575 B1 * | 5/2005 | Yu | B60K 16/00 | 180/65.265 |
| 7,135,786 B1 * | 11/2006 | Deets | B60K 16/00 | 290/44 |
| 7,147,069 B2 * | 12/2006 | Maberry | B60K 6/48 | 180/165 |
| 7,434,636 B2 * | 10/2008 | Sutherland | B60K 6/46 | 180/2.1 |
| 7,468,562 B1 * | 12/2008 | Barbic | B60H 1/143 | 180/65.1 |
| 7,547,983 B2 * | 6/2009 | Sabella | F03D 3/002 | 290/40 A |
| 7,641,005 B2 * | 1/2010 | Cong | B60K 16/00 | 180/2.1 |
| 7,665,554 B1 * | 2/2010 | Walsh | B60K 16/00 | 180/165 |
| 7,789,182 B2 * | 9/2010 | Bradley | B60K 16/00 | 180/165 |
| 7,802,641 B2 * | 9/2010 | Friedmann | B60K 16/00 | 180/2.1 |
| 7,810,589 B2 * | 10/2010 | Frierman | B60K 16/00 | 180/2.1 |
| 8,177,002 B2 * | 5/2012 | Cong | B60K 16/00 | 180/2.2 |
| 8,181,724 B2 * | 5/2012 | Cong | B60K 16/00 | 180/2.2 |
| 8,240,416 B2 * | 8/2012 | Cong | B60K 16/00 | 180/165 |
| 8,434,574 B1 * | 5/2013 | York | B60K 16/00 | 180/2.2 |
| 8,436,485 B1 * | 5/2013 | Smith | F03D 9/00 | 290/55 |
| 8,618,683 B2 * | 12/2013 | Diaz | F03D 9/00 | 290/44 |
| 8,710,691 B2 * | 4/2014 | Haddad | B60K 16/00 | 290/44 |
| 8,757,331 B2 * | 6/2014 | Laxhuber | B60K 16/00 | 180/65.31 |
| 8,791,588 B2 * | 7/2014 | Steinlechner | F03D 1/04 | 290/44 |
| 8,911,703 B2 * | 12/2014 | McAlister | B01J 19/20 | 123/320 |
| 8,967,302 B2 * | 3/2015 | Tran | B60K 16/00 | 180/2.2 |
| 2002/0153178 A1 * | 10/2002 | Limonius | F03D 9/002 | 180/2.2 |
| 2004/0084908 A1 * | 5/2004 | Vu | B60K 6/48 | 290/55 |
| 2005/0103537 A1 * | 5/2005 | Michaud | B60K 6/46 | 180/2.2 |
| 2005/0121242 A1 * | 6/2005 | Robinson | F03D 13/20 | 180/165 |
| 2005/0210858 A1 * | 9/2005 | Gore | B60K 16/00 | 60/201 |
| 2006/0113118 A1 * | 6/2006 | Kim | B60K 16/00 | 180/2.2 |
| 2006/0213697 A1 * | 9/2006 | Sutherland | B60K 6/46 | 180/2.2 |
| 2006/0272863 A1 * | 12/2006 | Donahue | B60K 16/00 | 180/2.2 |
| 2007/0107949 A1 * | 5/2007 | Bradley | B60K 16/00 | 180/2.2 |
| 2007/0163829 A1 * | 7/2007 | Ellis | F03D 3/002 | 180/165 |
| 2013/0038066 A1 * | 2/2013 | Diaz | F03D 9/00 | 290/55 |
| 2013/0158828 A1 * | 6/2013 | McAlister | B01J 19/20 | 701/70 |

* cited by examiner

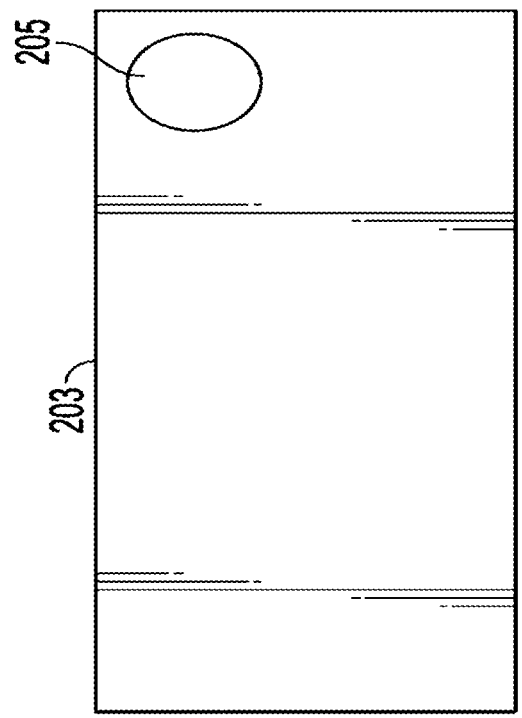
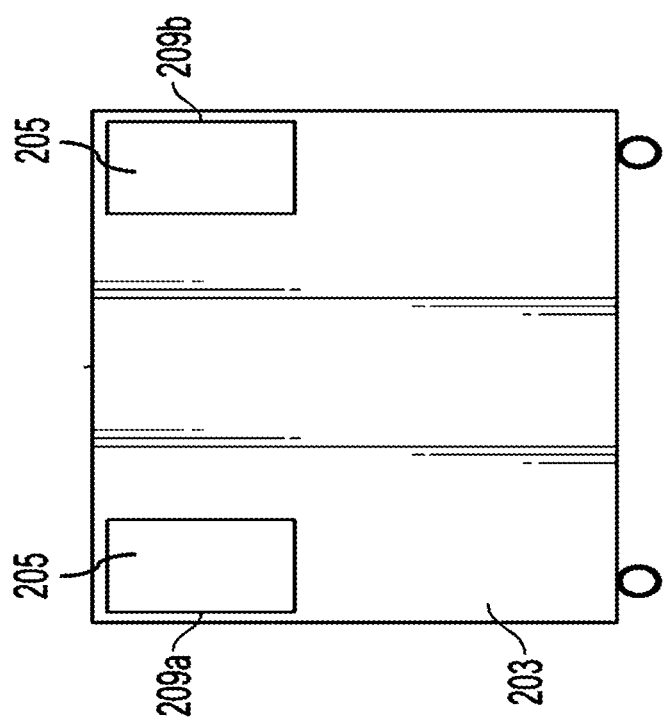

GENERATING ELECTRICITY FROM AIR RESISTANCE CAUSED BY A MOVING VEHICLE

CROSS REFERENCE TO RELATED APPLICATION

This application claims the benefit of priority to an Iran patent application having Iran Patent Application Serial Number 139350140003007705, filed on Oct. 12, 2014 and issued as Iran Patent Number 85207 on Mar. 4, 2015, the entire content of which is incorporated herein by reference.

TECHNICAL FIELD

The present application relates generally to harnessing air resistance or drag energy generated from a vehicle movement and, more particularly, to a system for converting harnessed drag energy into electricity.

BACKGROUND

Wind turbines have been long used for harnessing wind energy and converting the harnessed energy into other types of energy such as electricity. These turbines are typically stationary and installed in a certain location to convert kinetic energy from the wind into electricity.

On the other hand, motion of vehicles, such as trains, with high speeds generate a drag force, also referred to as air resistance which is a type of friction which acts opposite to the relative motion of the vehicle moving with respect to the surrounding fluid (e.g., air). The air resistance due to vehicular motion can generate high levels of energy that is wasted and if harnessed can produce a source of energy.

Some of the known technologies suggest installation of wind turbines in specific locations along highways or train tracks to capture winds generated from vehicular motion on the highway or on the tracks. For example, FIG. 1 illustrates a set of turbines installed on a road side to capture the wind produced from vehicular movements. Other known technologies suggest installing rotating devices on train tracks such that the wind generated by passing of the trains can cause a wheel inside the device to rotate and the rotation can generate electricity. Some other suggested systems include installing an array of low friction dynamo bearings around the train tracks and transferring the energy generated in the dynamo bearings from the wind due to train motion to a central system to be stored in batteries. However, the systems suggested by those known technologies include installing stationery devices to harness the wind energy when vehicles motion against the stations where the devices are installed and as a result in such systems when there is no vehicle traffic on the road or the track, no energy can be generated.

Therefore, a need exists for a wind power harnessing system to be installed on a moving vehicle to generate power throughout the entire time of a vehicle travelling.

SUMMARY

A system for generating electricity is provided. The system includes a vehicle and a wind turbine installed at one end of the vehicle. The wind turbine includes a set of input ports and a set of exit ports. The wind turbine, the set of input ports, and the set of exit ports can be located symmetrically on the vehicle body. Airflow, generated around the vehicle when the vehicle motions forward, can enter the wind turbine via the set of input ports and exits via the set of output ports causing the wind turbine to rotate and generate the electricity. The airflow around the vehicle can rotate the wind turbine without increasing drag forces generated due to friction between air and the vehicle body. The wind turbine can be installed at the one end of the vehicle during manufacturing of the vehicle. The wind turbine can be installed at the one end of the vehicle, subsequent to manufacturing of the vehicle. The vehicle can be a train fleet including a locomotive and one or more train cars, and the wind turbine can be installed at the end of a last train car of the train fleet. The wind turbine may cause reduction of air resistance around the vehicle body while generating electricity. The symmetrical location of the wind turbine, the set of input ports and the set of output ports may cause reduction of drag forces generated due to friction between air and the vehicle body. The reduction of drag forces may reduce air resistance against vehicle motion. The wind turbine can be installed such that the installation does not affect a structure of the vehicle body. The wind turbine may be installed in parallel with the airflow.

A system for generating electricity may include a vehicle, a first wind turbines installed on the vehicle, and a second wind turbine installed on the vehicle. The first and the second wind turbine can each be installed in an encasement including a set of input ports and a set of output ports. Airflow around the vehicle may enter the first and second wind turbines via the set of input ports and exit via the set of output ports causing the first and second wind turbines to rotate and generate the electricity. The first and second wind turbines may be located symmetrically in the encasements with a 180 degrees rotation among the axles of the first and second wind turbines. The first and second wind turbines may be installed at one end of the vehicle during manufacturing of the vehicle. The first and second wind turbines may be installed at one end of the vehicle, subsequent to manufacturing of the vehicle. The vehicle may include a train fleet including a locomotive and one or more train cars and the first and second wind turbines can be installed at a last train car of the train fleet. The electricity can be generated by a power generator connected to the first and second wind turbines. The power generator can be an AC or a DC power generator.

BRIEF DESCRIPTION OF THE DRAWINGS

Features of the subject technology are set forth in the appended claims. However, for purpose of explanation, several implementations of the subject technology are set forth in the following figures.

FIGS. 3A-3C illustrate different views of the wind turbine locations shown in FIG. 2.

DETAILED DESCRIPTION

Figure 1:
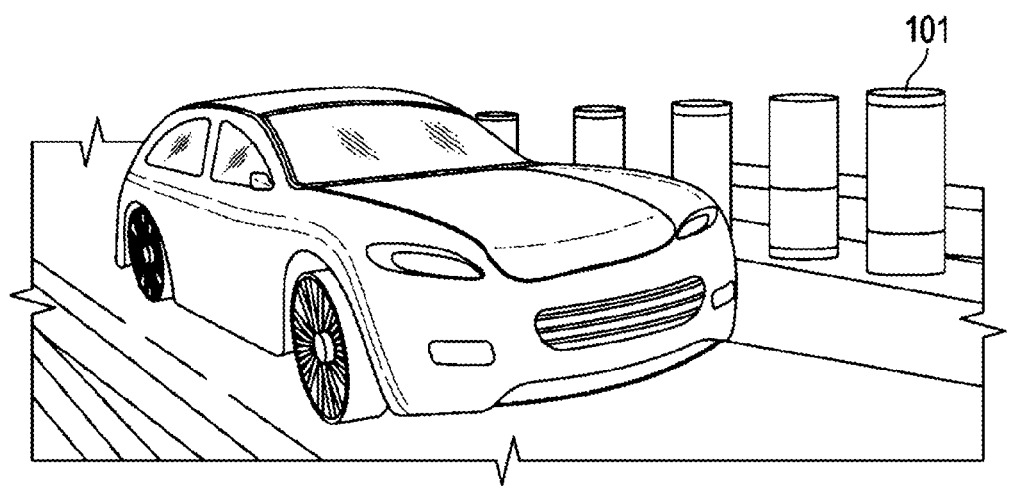
FIG. 1 illustrates a set of turbines installed on a road side to capture the wind produced from vehicular movements.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The instant application relates to a system for harnessing air resistance or drag energy generated from a vehicular movement and converting the harnessed drag energy into electricity. The system may include one or more wind turbines installed on the vehicle (e.g., a train) to rotate with the wind generated from the vehicular movement. In addition to power generation, the system can reduce air resistance against the vehicle movement direction. Moreover, the system design does not affect the dimensions and physical shape of the vehicle body.

Drag force or air resistance is a type of friction referring to forces acting opposite to the relative motion of an object (e.g., a vehicle) moving with respect to surrounding air. The drag force can exist between an air layer and the solid surface of the vehicle body. Unlike other resistive forces, such as dry friction, which are nearly independent of velocity, drag forces depend on velocity of the moving object. Drag forces may decrease air velocity relative to the solid object in the air's path.

The air resistance occurs in front and back of the moving vehicle. The air resistance is a result of friction between the body of the vehicle and surrounding air, and the amount of the resistance depends on the shape of the body of the vehicle. In one implementation of the present disclosure, the airflow generated around the vehicle due to the air resistance can be controlled and used for generating electricity by one or more wind turbines installed on the vehicle.

Drag force is the force that a moving body feels when the flow of air around it starts to become turbulent. The drag force increases with speed and according to the square of the speed. In other words, if the speed doubles, the drag roughly quadruples. Fast-moving vehicles use most of their energy overcoming drag. For example, once the speed reaches about 300 km/h (180 mph), virtually all the energy may be used to push the air out of the way. The disclosed system can generate electricity from this energy that is used to overcome the drag forces. In the disclosed system, the air may move toward the back of the vehicle and into the wind turbines and as a result air pressure and friction may reduce on the sides of the vehicle.

Wind turbines can be installed on the sides of the vehicle body close to the end of the body. Installing the wind turbines in this way can reduce the air turbulence behind the vehicle and therefore prevent the extra drag force from acting in the direction of the driving force of the vehicle. Furthermore, installing the wind turbines in this way may result in generation of electricity from wind even when the vehicle is stopped. In a moving vehicle, and as the vehicle engine overcomes the air resistance against the driving direction of the vehicle, airflows are generated above and below the vehicle body and against the travelling direction of the vehicle. Part of the airflow can flow through the wind turbines installed on the vehicle body and cause turning of the wind turbines. The turning of the wind turbines can in return generate electricity.

The wind turbines used by the disclosure can be, for example, small wind turbines with two blades and a horizontal shaft and with an output power of 0.4 to 0.45. The wind turbine output power is discussed below with regards to equations (1) and (2).

In one specific example, in the disclosed system the wind turbines are installed on a train. In a train fleet including a locomotive and passenger cars, the speed may reach 80 kilometers per hour. The wind turbines installed on such a train may produce at least a thousand Watts electricity depending on the location of the wind turbines on the train body, the technical characteristics of the wind turbines, and other related factors. A software simulation of the disclosed system can provide information for preventing increase of resistance forces and for measuring speed of the wind and also for estimating amount of the produced electricity. Results from the simulated model can be compared with calculated results. The stimulated results show that when the train speed is adjusted at a level for having the least required energy for turning the wind turbines, the wind turbines may result in production of one kilowatts of electricity. The output pressure of the disclosed system is increased and this increase shows a reduction in friction. The air passing through the wind turbines may cause lower friction between the air and the vehicle body and circular and turbulent airflows can reduce as well. Therefore, the drag force on the vehicle body can reduce.

The disclosed system can use the speed of wind for rotating wind turbines without an increase in drag forces and produce electricity based on vehicle's speed. Rail transportation networks may have various train fleets with different speed, axle load capacity, passenger capacity, body dimensions and geometrical structure of the body. For the sake of simplicity of the disclosure, an example of such fleets is discussed. In this example, a train fleet including Alstom locomotive and the International Union of Railways (UIC) passenger coaches of class Z2 are considered. However, the disclosure is not limited to trains and certainly not limited to the example discussed herein.

Figure 2:
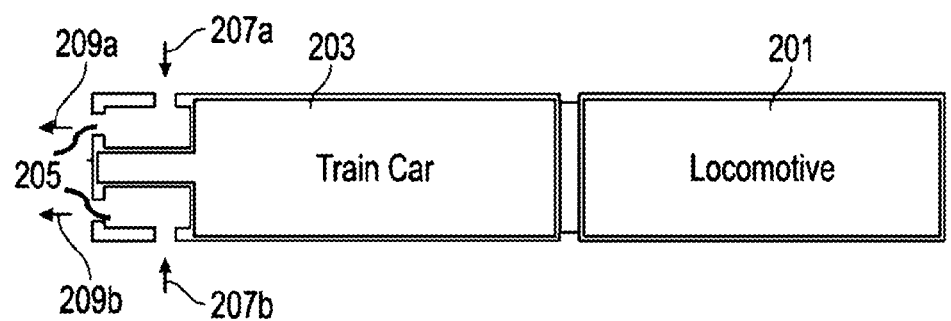
FIG. 2 illustrates a wind turbine installed on a train's end, according to one implementation of the instant application.

FIG. 2 illustrates wind turbines installed on a train, according to an implementation. The train fleet illustrated in FIG. 2 may include a locomotive 201, and one or more train cars 203 (only one car is shown in FIG. 2). The train car 203 can be a passenger coach, a cargo train, etc. The wind turbine 205 can be installed at the end of the last car 203. The wind generated by train velocity enters turbine 205 via input ports illustrated by arrows 207a and 207b. The air exits turbine 205 via exit ports shown by arrows 209a and 209b. It is noted that the wind turbine 205 can be incorporated into the structure of train car 203 at manufacturing level. In other instances, the wind turbine 205 can be installed on a previously manufactured train car 203.

The wind turbines 205 can be installed on the end of the train and in symmetrical locations so that no extra drag force is applied to the body and electricity is generated from the existing drag forces. In addition, the input ports 207a-207b and the exit ports 209a-209b can also be installed symmetrically to prevent generation of additional drag forces and reduce the drag forces generated due to friction between air and the vehicle body. The symmetrical installation of the input ports 207a-207b and exit ports 209a-209b may cause balance between air pressure on two sides of the train body and therefore, air can flow smoothly into the input ports 207a-207b and out from the exit ports 209a-209b. Moreover, the wind turbine 205 can be installed in different locations on a vehicle (e.g., the train fleet) such as, for example, on the roof of a train car.

In an exemplary implementation, two wind turbines can be installed inside two encasements at the end of the train car 203. The axles of the two wind turbines can be positioned with a 180 degrees against each other such that a symmetric balance is achieved and the drag forces against the vehicle body can be omitted or reduced by the turbines.

Figure 3C:
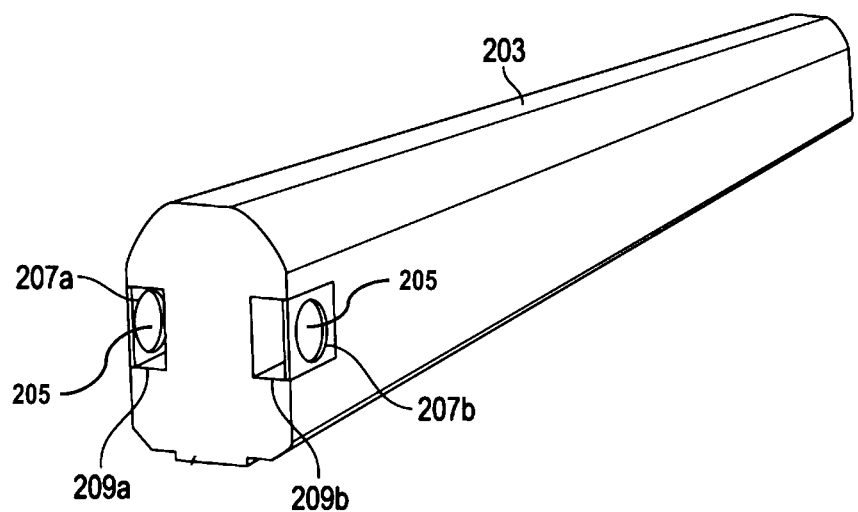

FIGS. 3A-3C illustrate different views of the wind turbine location 205 shown in FIG. 2. FIG. 3A illustrates a rear view of the train. In the view shown in FIG. 3A, the last car 203, turbine 205 and air exits ports 209a and 209b are shown. FIG. 3B illustrates a side view of the train. In the view shown in FIG. 3B, the last car 203 and turbine 205 are shown. As shown in FIG. 3B, the wind turbine 205 can be installed parallel to the length of train car 203 or parallel to the direction of airflow around train car 203. FIG. 3C illustrates a structure of the train car 203 with turbine 205 installed at the end of the car 203. The air exit ports 209a and 209b are also shown in FIG. 3C.

Figure 4A:
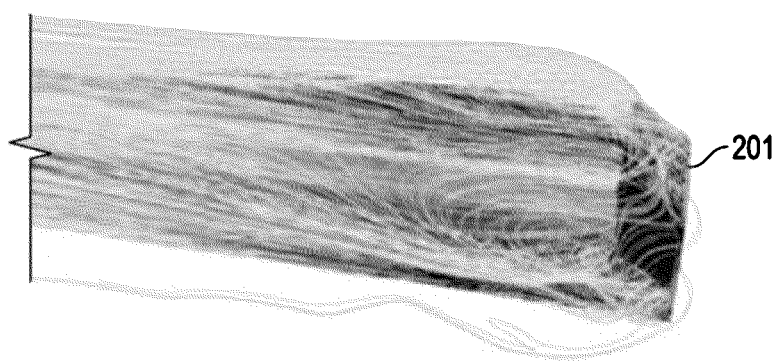
FIGS. 4A-4E illustrate various patterns of air circulation around a train body.

FIGS. 4A-4E illustrate various patterns of air circulation around a train. In FIGS. 4A-4E various patterns of air circulation around a moving train body with and without an air turbine 205 are illustrated. Various Parameters such as, the direction of airflow caused by the train motion, air velocity caused by the train motion, pressure and force generated in the direction of airflow (which is opposite the driving force of the train), etc. can be measured and analyzed. FIG. 4A illustrated airflow patterns in front of the train around the locomotive 201. As shown in FIG. 4A, with a forward motion of the train, winds are generated on the sides and above the locomotive 201.

The generated winds would typically generate drag forces against the driving force of the train and can cause friction between the train and air around the train. The generated winds, cause by air resistance against the driving force of the train, flow against the moving direction of the train towards the end of the train. Part of the energy generated by the train engine is wasted to overcome this aerodynamic resistance. The disclosed technique for installation of a wind turbine on the train can use at least part of the wasted energy for overcoming the air resistance to produce electricity via the on board turbine.

Figure 4B:
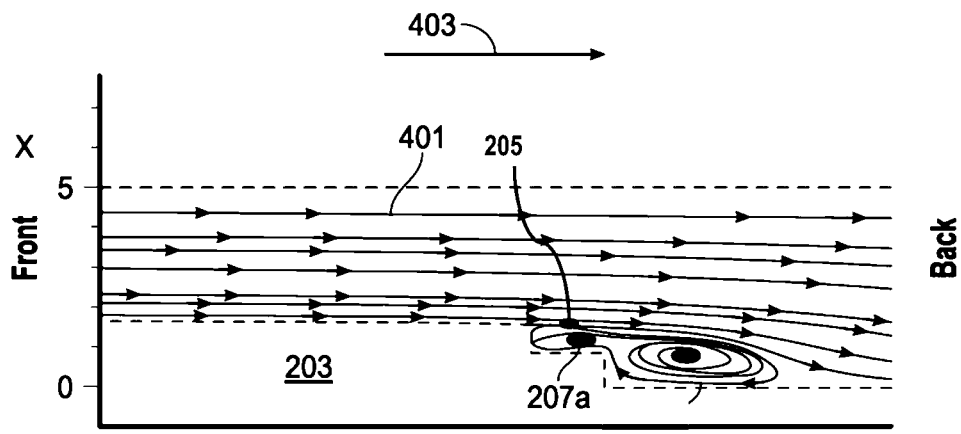

FIG. 4B illustrates airflow patterns at the end of a train having a wind turbine installed. FIG. 4B illustrates a sectional view of the last car 203 of a train along the length of the train. The air (shown as 401) flows in direction 403 from front towards the end of the last train car 203. As shown in FIG. 4B, part of the flowing air enters turbine 205 from input ports 207a and 207b (only 207a shown) and make the wind turbine rotate. The airflow may then exit the wind turbine 205 via exit ports 209a and 209b (not shown in FIG. 4B). The rotation of turbine by the airflow can generate electricity.

Figure 4C:
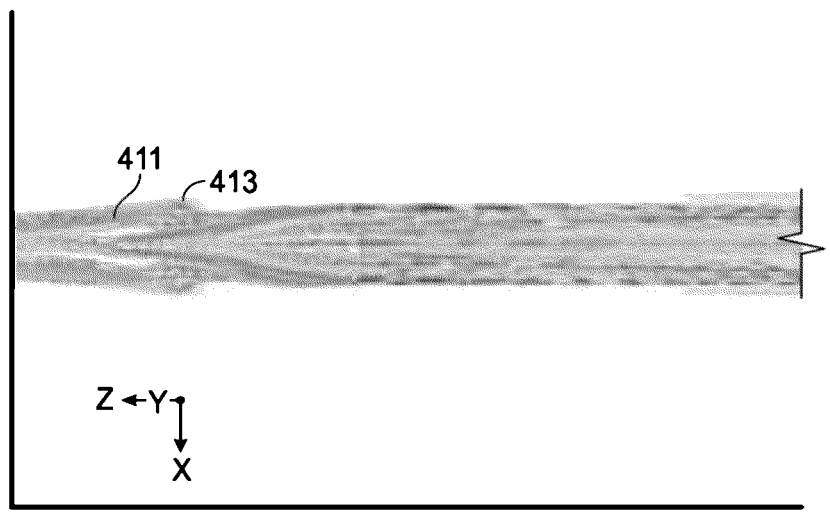
Figure 4D:
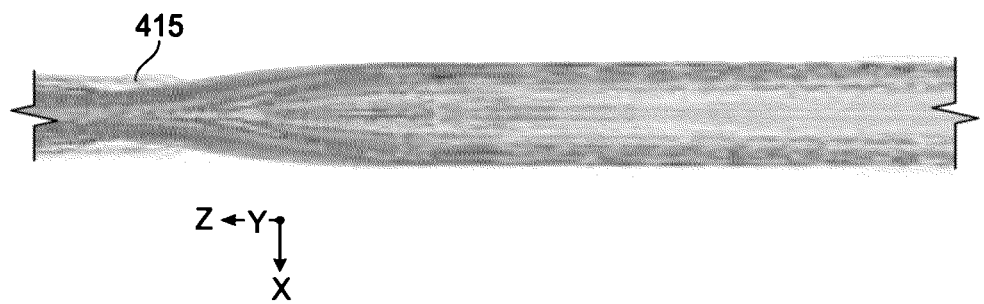

FIG. 4C illustrates an airflow model around a typical train without a wind turbine, while FIG. 4D illustrates airflow model around a train similar to the train of FIG. 4C with a wind turbine installed. As shown in FIG. 4C, the airflow around a typical train may cause burbled and vertical flow around the train body shown as 411 and 413. However, as shown in FIG. 4D, the wind turbine installed on the train (turbine not shown in FIG. 4D) causes reduction of the burbled and vertical airflow shown as 415. The analysis and comparison of the two airflow models of FIGS. 4C and 4D shows that wind turbine 205 may reduce drag force and air resistance around the train body while generating electricity.

Figure 4E:
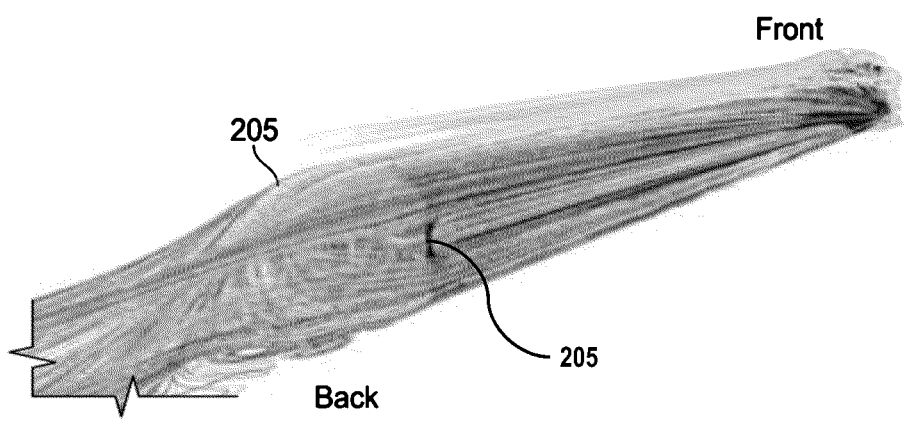

FIG. 4E illustrates airflow around the body of a train and how the flow enters turbine 205. The amount of electricity generated by turbine 205 can be calculated based on the train speed and the airflow that exits the wind turbine 205 from exit ports 209a and 209b (shown in FIG. 2). Specific measurements can verify that the drag force and the air resistance against train motion can provide a sufficient level of airflow pressure to rotate the wind turbine and cause electricity generation. Based on the calculations, up to one kilowatts of electricity can be generates by wind turbine 205.

Figure 5A:
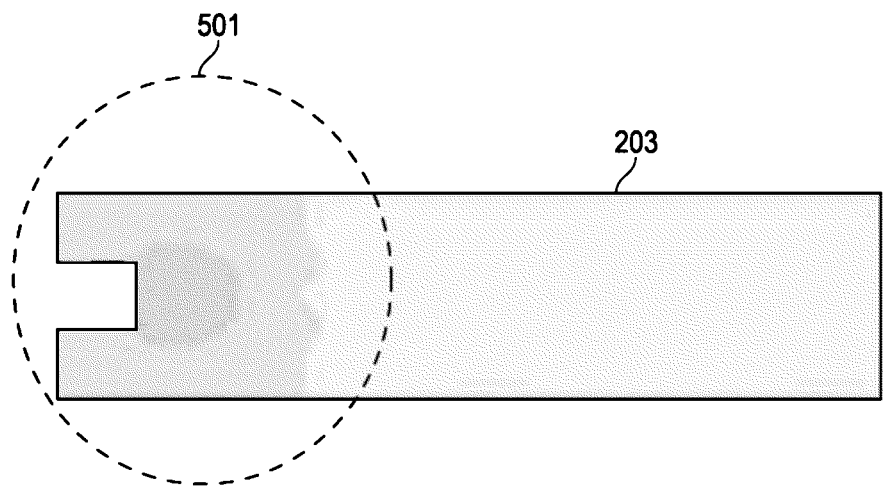
FIGS. 5A-5B illustrate air pressure at the end of a train with and without a wind turbine installed on the train body, according to one implementation of the instant application.
Figure 5B:
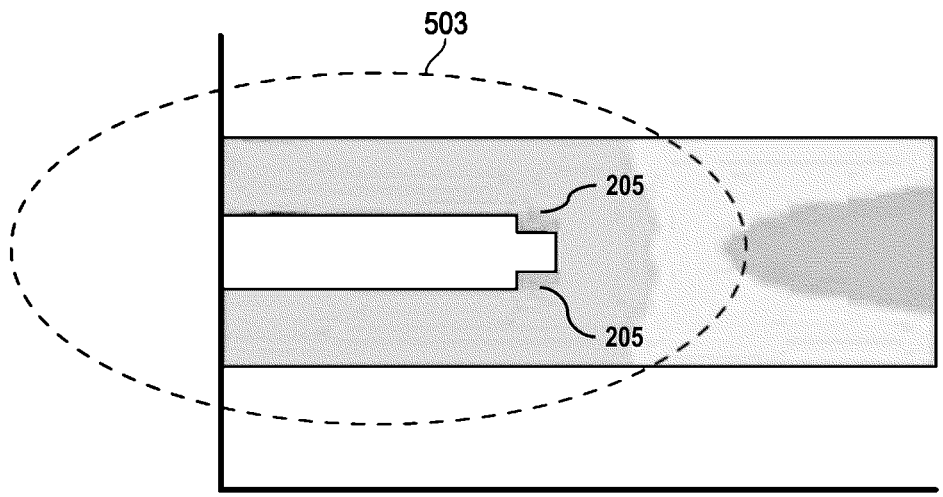

FIGS. 5A-5B illustrate air pressure at the end of the train with and without a wind turbine installed. As previously discussed, drag force and air resistance against the train motion can cause a change in air pressure behind the train. For example, in a typical train, without a wind turbine, the air pressure behind the train may decrease due to the drag forces. However, installation of a wind turbine at the end of the train may cause the drag force and the friction to decrease and as a result the air pressure behind the train may increase and facilitate forward movement of the train. FIG. 5A illustrates air pressure behind a typical train. In FIG. 5A, the air pressure behind the last car 203 is shown as the gray area inside the dotted circle 501.

FIG. 5B illustrates the air pressure behind the train when a wind turbine is installed. As shown in FIG. 5B, the air pressure behind the last car 203 having a wind turbine 205 installed can be seen as a gray area within the dotted circle 503. The airflow entering and exiting the wind turbine 205 via the input ports 207a, 207b, 209a and 209b (shown in FIG. 2) may cause the increase shown in air pressure 503 in comparison with air pressure 501.

As previously discussed, in this example, a train fleet including Alstom locomotive and the International Union of Railways (UIC) passenger coaches of class Z2 is discussed. The specification of the example train fleet according to the UIC standard 567-2 is shown in Table 1.

The electricity generated by a wind turbine 205 depends on the wind strength. The minimum electricity generated can be calculated based on an average train speed. The maximum speed of the example train fleet can be about 160 kilometers per hour. This is the maximum speed without consideration of turns in train tracks and acceleration time. For a train travelling with an average speed of 80 kilometers per hour, the wind speed around the train can be estimated at 80 kilometers per hour as well.

TABLE 1

| TYPE | WEIGHT (TONS) | LENGTH (METERS) | SECTIONAL AREA (SQUATE METERS) | MAXIMUM SPEED (KILOMETERS PER HOUR) |
| --- | --- | --- | --- | --- |
| ALSTOM LOCOMOTIVE | 123 | 21.54 | 12.5 | 140 |
| PASSENGER CAR Z2 | 48.5 | 26.1 | 11.8 | 160 |

Equation (1) shows a calculation of airflow speed:

$$Q = C_V A V \quad (1)$$

In Equation (1), Q is the airflow speed in cubic meters per second, $C_V$ is the split effect factor (e.g., the lowest wind speed for generating electricity), A is the area of an encasement inside which the turbine is installed (in square meters), and V is air speed in meters per second. The value of $C_V$ for an airflow perpendicular to the train body surface can be about 0.5 to 0.6 cubic meters per second. For an airflow diagonal to the train body surface, the value of $C_V$ can be around 0.25 to 0.35 cubic meters per second.

Equation (2), shows a calculation of the output power of the wind turbine.

$$P_T = 0.5 C_P \rho Q V^2 \qquad (2)$$

In equation (2), $P_T$ is the output power of the wind turbine in Watts. $C_P$ is power coefficient. The value of $C_P$ is assumed to be 0.4. Letter p represents air density which equals 1.255 kilograms per cubic meter. Q is the airflow speed calculated by equation (1) and V is the air speed in meter per seconds.

In some instances, wind turbine 205 can be a small wind turbine of a type disconnected from the power network. The output power of such turbines can be between 0.4 and 0.45.

The rotation speed of blade tips of a wind turbine 205 can be calculated using equation (3).

$$\lambda = \omega R / V_W \qquad (3)$$

In the example of this disclosure, value of $\lambda$ is assumed to be 6. In this case, the value of $C_P$ can be between 0.4 and 0.45. The split effect factor $C_V$ or the lowest speed of wind for electricity generation can be around 5 meters per second.

Figure 6A:
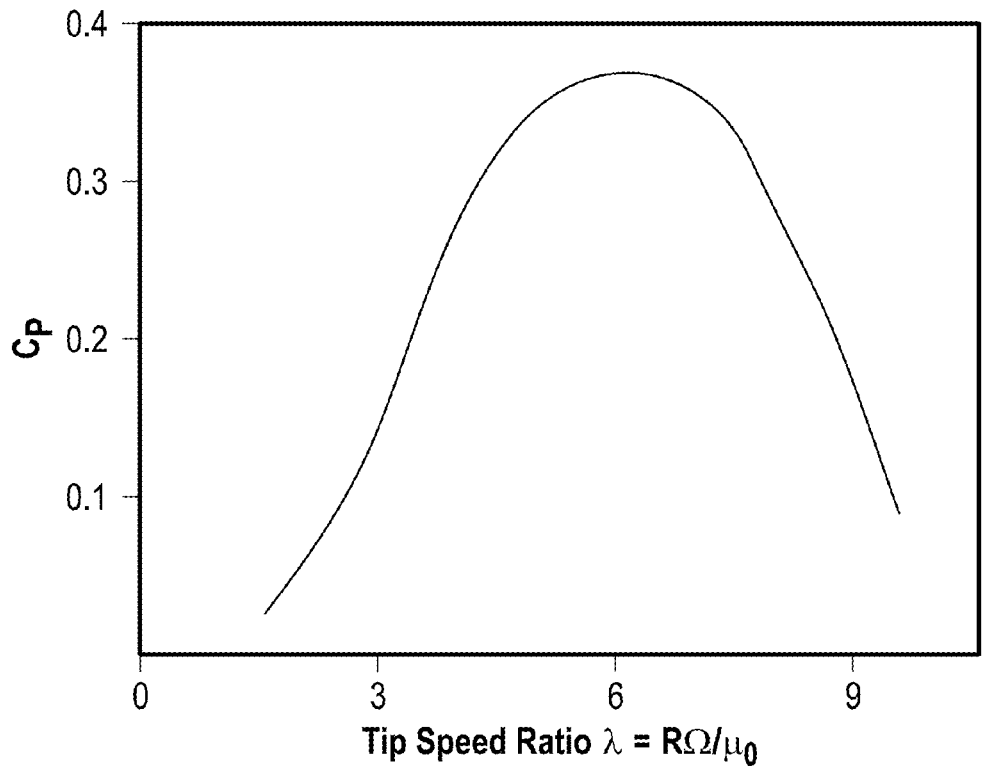
FIGS. 6A-6B illustrate graphs for power factor and axial displacement coefficient, according to an exemplary implementation.
Figure 6B:
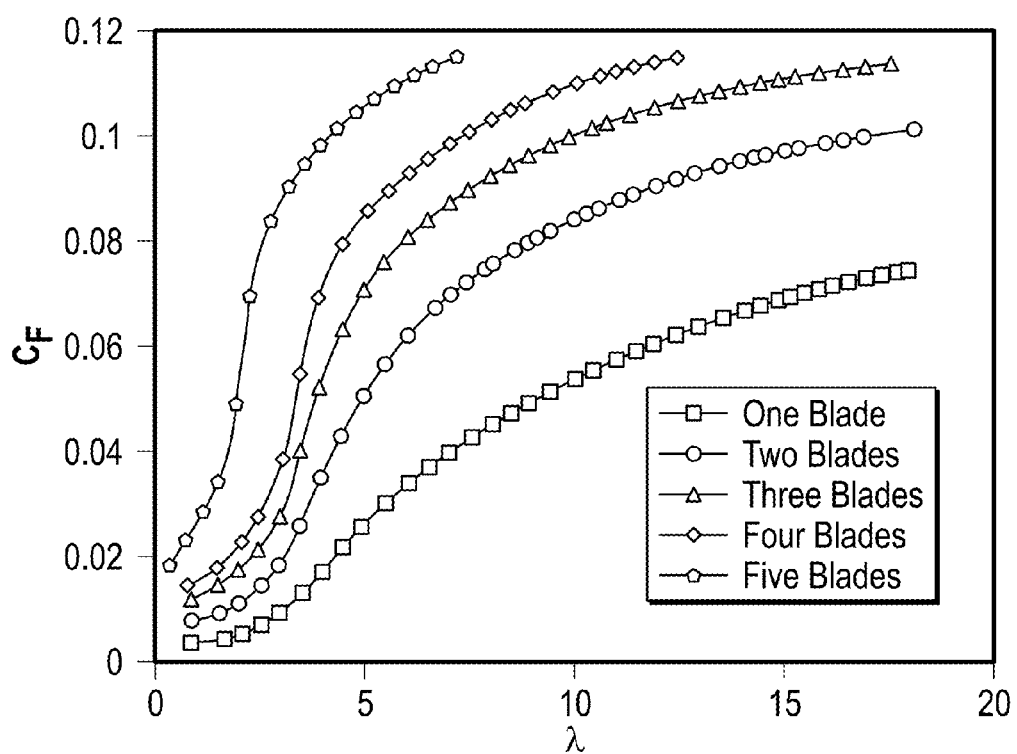

FIGS. 6A-6B illustrate graphs for power factor and axial displacement coefficient, according to an exemplary implementation. As shown in FIG. 5A, when $\lambda=6$, $C_P=0.4$ and $C_F=0.055$, then $C_P/C_F=7$.

One or more wind turbines 205 can be installed at the end of the train parallel to the airflow. The diameter of a wind turbine 205 can be around 100 centimeters. In addition, a power generator (e.g., an AC power generator with a 3 phase electromagnetic coil) can be connected to the wind turbines 205. An AC power generator may, for example, have 8 magnets. Alternatively, a DC power generator can be used and the generated DC power can be converted to AC power using a voltage converter.

As previously discussed, the output power of the generated electricity can be calculated based on the airflow speed. The area A of an encasement for the wind turbine 205 can be calculated as follows:

$$A = 3.14 \times 0.5^2 = 0.785 \text{ m}^2$$

$$Q = C_V A V = 0.25 \times 0.785 \times 22 \times 2 = 8.635 \text{ m}^3/\text{s}$$

Therefore, based on the size of the wind turbine encasement (e.g., $A=0.785 \text{ m}^2$), when the axial displacement coefficient $C_V$ is 0.25 (e.g., for a diagonal airflow) and the air speed V is 22 meters per second (or 80 kilometers per hour), the airflow speed Q is 8.635 cubic meters per second. In this example, the output power can be calculated as:

$$P_W = \frac{1}{2} \rho Q V^2 = \frac{1}{2} \times 1.255 \times 8.635 \times 22 \times 22 = 2622 \text{ W}$$

In this example, $P_W$, the power for the wind turbine at the end of a train car can be 2633 Watts. However, when the $C_P$ value $C_P=4$ is incorporated in the calculation the power output PT is:

$$P_T = 2622 \times 0.4 = 1048.8 \text{ W} = 1000 \text{ W}$$

According to the above calculations, with the assumptions discussed above, the output power of the two wind turbines can be about 1000 Watts or one kilowatts. Therefore, each wind turbine may have an approximate output power of 500 kilowatts. This power can be achieved by two wind turbines installed on a moving train such that the air speed of 22 meters per second, or 80 kilometers per hour, is accessible to the wind turbines. However, the wind turbines can continue generating electricity even when the train fleet is in stopping position.

The disclosure provides multiple advantages such as a structure for providing a clean source of energy for generating electricity from airflow around a moving vehicle such as a train fleet. The electricity can be generated from the energy typically wasted to overcome aerodynamic resistance. In other words, the wasted energy can be recycled into electricity. This may cause reduction in use of fossil fuel and reduction in drag forces. The disclosure can be widely applicable to various transportation vehicle such as train fleets that travel long distances on tracks with high capability of speed control and possibility of keeping vehicle velocity at desired levels for extended durations. The generated energy can provide additional source of energy for the fleet. The generated energy can also be stored or loaded into a network for further circulation and use by other consumers.

The separation of various system components in the examples described above should not be understood as requiring such separation in all examples, and it should be understood that the described components and systems can generally be integrated together in a single packaged into multiple systems.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

What is claimed is:

1. A system for generating electricity comprising:
    a vehicle; and
    a first wind turbine and a second wind turbine, installed at one end of the vehicle, wherein:
    an input port for the first wind turbine and an input port for the second wind turbine are located symmetrically on a body of the vehicle, input
    the first wind turbine and the second wind turbine are located symmetrically, with the axle of the first wind turbine being rotated 180 degrees relative to the axle of the second wind turbine,
    an exit port for the first wind turbine and an exit port for the second wind turbine are located symmetrically on the body of the vehicle, and
    airflow, generated around the vehicle when the vehicle is in forward motion, enters the first and second wind turbines via the respective input ports for the first and second wind turbines and exits the first and second wind turbines via the respective exit ports for the first and second wind turbines causing the first and second wind turbines to rotate and generate the electricity.

2. The system of claim 1, wherein the airflow around the vehicle rotates the first and second wind turbines without increasing drag forces generated due to friction between air and a body of the vehicle.

3. The system of claim 1, wherein the first wind turbine and the second wind turbine are installed at the one end of the vehicle during manufacturing of the vehicle.

4. The system of claim 1, wherein the first and second wind turbines are installed at the one end of the vehicle subsequent to manufacturing of the vehicle.

5. The system of claim 1, wherein the vehicle is a train fleet including a locomotive and one or more train cars and wherein the first and the second wind turbines are installed at the end of a last train car of the train fleet.

6. The system of claim 1, wherein the first and second wind turbines cause reduction of air resistance around a body of the vehicle while generating electricity.

7. The system of claim 1, wherein the symmetrical location of the first and second wind turbine, the respective input ports and exit ports for the first and second wind turbines causes reduction of drag forces generated due to friction between air and the body of the vehicle.

8. The system of claim 7, wherein the reduction of drag forces reduces air resistance against vehicle motion.

9. A system for generating electricity comprising:
    a vehicle;
    a first wind turbine installed on the vehicle; and
    a second wind turbine installed on the vehicle, wherein:
    the first wind turbine and the second wind turbine are each installed in a respective encasement, each encasement including an input port and an exit port,
    the first wind turbine and the second wind turbine are located symmetrically in their respective encasements, with the axle of the first wind turbine being rotated 180 degrees relative to the axle of the second wind turbine, and
    airflow around the vehicle enters the first wind turbine via the respective encasement input port and exits via the respective encasement exit port, and enters the second wind turbine via the respective encasement input port and exits via the respective encasement exit port causing the first wind turbine and the second wind turbine to rotate and generate the electricity.

10. The system of claim 9, wherein the first and second wind turbines are installed at one end of the vehicle during manufacturing of the vehicle.

11. The system of claim 9, wherein the first and second wind turbines are installed at one end of the vehicle subsequent to manufacturing of the vehicle.

12. The system of claim 9, wherein the vehicle includes a train fleet including a locomotive and one or more train cars and wherein the first and second wind turbines are installed at a last train car of the train fleet.

13. The system of claim 9, wherein the electricity is generated by a power generator connected to the first and second wind turbines.

14. The system of claim 9, wherein the power generator is an AC or a DC power generator.

15. The system of claim 9, wherein the airflow around the vehicle rotates the first and second wind turbines without increasing drag forces generated due to friction between air and a body of the vehicle.

16. The system of claim 9, wherein the first and second wind turbines cause reduction of air resistance around a body of the vehicle while generating electricity.

* * * * *